(12) United States Patent
Kajitani

(10) Patent No.: US 7,163,025 B2
(45) Date of Patent: Jan. 16, 2007

(54) VACUUM REGULATING VALVE

(75) Inventor: Masao Kajitani, Ibaraki (JP)

(73) Assignee: SMC Corporation, Tokyo (JP)

( * ) Notice: Subject to any disclaimer, the term of this patent is extended or adjusted under 35 U.S.C. 154(b) by 261 days.

(21) Appl. No.: 10/890,468

(22) Filed: Jul. 12, 2004

(65) Prior Publication Data

US 2005/0045235 A1 Mar. 3, 2005

(30) Foreign Application Priority Data

Sep. 2, 2003 (JP) .............................. 2003-310606

(51) Int. Cl.
*F16K 11/20* (2006.01)
*F16K 47/08* (2006.01)

(52) U.S. Cl. .............................. 137/601.13; 251/63.6; 251/285

(58) Field of Classification Search ........... 137/599.05, 137/599.06, 599.07, 601.13 I, 601.14; 251/63.6, 251/285
See application file for complete search history.

(56) References Cited

U.S. PATENT DOCUMENTS

| | | | | |
|---|---|---|---|---|
| 3,426,793 A | * | 2/1969 | Klemm et al. ......... | 137/599.06 |
| 3,477,466 A | * | 11/1969 | Sturm ................... | 137/601.13 |
| 5,289,811 A | * | 3/1994 | Covert et al. .............. | 123/520 |
| 5,848,608 A | * | 12/1998 | Ishigaki ................. | 137/599.16 |
| 6,494,229 B1 | | 12/2002 | Kajitani | |
| 6,814,338 B1 | * | 11/2004 | Kajitani ..................... | 251/63.6 |

FOREIGN PATENT DOCUMENTS

JP 2001-263532 9/2001

* cited by examiner

*Primary Examiner*—Stephen M. Hepperle
(74) *Attorney, Agent, or Firm*—Peter Ganjian

(57) ABSTRACT

A vacuum regulating valve which is simplified in structure and where the flow rate characteristic in evacuating a vacuum vessel is improved, comprises (i) a main valve 1A of a large size which has: a principal body 4 having two main ports 11, 12 connected to a vacuum vessel 7 and a vacuum pump 8, respectively, a valve seat 14 disposed in a fluid passage connecting the ports 11, 12, a valve element 15 seated on and separated from the valve seat 14, and a shaft 20 extending from the valve element 15; and a valve element operating unit 5 for operating the valve element 15 via the shaft 20, and (ii) a sub valve 2A of a small size similar in structure to the main valve 1A. The sub valve 2A is attached to an outer side surface of a casing 10 of the main valve 1A.

10 Claims, 7 Drawing Sheets

VACUUM REGULATING VALVE

BACKGROUND OF THE INVENTION

1. Field of the Invention

The present invention relates to a vacuum regulating valve for regulating the pressure in an evacuated vacuum vessel for chemical reaction included in a physical or chemical machine or the like.

2. Description of Related Art

A chemical process, such as an etching process, is carried out in a vacuum vessel included in a semiconductor device fabricating system. The vacuum vessel is evacuated at a negative pressure by a vacuum pump. Such a pressure regulating valve is placed in an external line connecting the vacuum vessel to the vacuum pump and has two ports connected, respectively, to a vacuum vessel and a vacuum pump, internal passage connecting the two ports, a valve seat formed in the internal passage, a valve element to be seated on the valve seat to close the pressure regulating valve, and a valve element operating unit, such as one comprising a cylinder actuator, for moving the valve element onto and away from the valve seat to close and open the pressure regulating valve. The vacuum in the vacuum vessel is regulated by opening/closing the valve through the operation of the valve element operating unit.

For instance, in reducing the pressure in the vacuum vessel, for instance, fully opening the vacuum regulating valve to rapidly evacuate the vacuum vessel is likely to cause a large volume of the gas in the vessel to flow all at once which leads to an undesirable turbulence in the vacuum vessel and the external and internal passages, with stirring up particles in the vessel and passages. Therefore, there has been proposed an arrangement for improving the gas flow characteristics, as disclosed in JP-A-2001-263532 for instance, where a main fluid passage having a relatively large section area and a sub fluid passage having a relatively small section area are disposed in parallel in a vacuum regulating valve. In operation, the sub fluid passage is first opened to perform in an initial period of a vacuuming operation, and the main fluid passage is subsequently opened to perform the vacuuming operation in full.

However, the above conventional valve is somewhat complex in structure, since a sub valve mechanism for opening/closing the sub fluid passage having the relatively small cross section is dually disposed inside a valve element, a valve stem, a piston, etc. of a main valve mechanism for opening/closing the main fluid passage. Thus, there has been a request for a vacuum regulating valve which is simplified in structure.

SUMMARY OF THE INVENTION

Therefore, an object of the present invention is to provide a vacuum regulating valve, which is simple in structure and exhibits improved air flow characteristics in reducing the pressure in a vacuum vessel.

To attain the above object, the invention provides a vacuum regulating valve comprising: a main valve which has a relatively large size and comprises: a casing which defines therein a valve chamber extending along an axis of the main valve, and which has: a first main port which is capable of communicating with the valve chamber through a communication opening and is connected to a vacuum vessel; and a second main port connected to a vacuum pump; a main valve seat formed at an outer periphery of the communication opening; a main valve element which is disposed in the valve chamber and seated on and separated from the main valve element; a main valve stem extending in the valve chamber from the main valve element; and a main valve element operating unit which drives the main valve stem to move the main valve element onto and away from the main valve seat; and a sub valve which has a relatively small size, is attached to an external side surface of the casing of the main valve, and comprises: a bypass passage which extends from and outside the casing to bypass the main valve seat; a sub valve seat which is disposed in the bypass passage and has an opening area which is smaller than an opening area of the main valve seat; a sub valve element which is seated on and separated from the sub valve element; a sub valve stem extending from the sub valve element; and a sub valve element operating unit which drives the sub valve stem to move the sub valve element onto and away from the sub valve seat.

The vacuum regulating valve is constructed such that the casing has a first connecting hole and a second connecting hole which are formed through the thickness of the casing, and the bypass passage has two opposite ends, one of which serves as a first bypass port connected to the first main port through the first connecting hole, while the other of which serves as a second bypass port connected to the second main port through the second connecting hole.

In the vacuum regulating valve, the main valve element operating unit and the sub valve element operating unit may be substantially identically constructed.

According to a mode of this invention, the main valve element operating unit comprises: a main piston attached to an end of the main valve stem; a main pressure chamber accommodating a fluid whose pressure acts on the main piston and is controlled to move the main valve element in a direction away from the main valve seat; and a main pilot port for therethrough supplying the main pressure chamber with a pilot fluid, while the sub valve element operating unit comprises: a sub piston attached to an end of the sub valve stem; a sub pressure chamber accommodating a fluid, whose pressure acts on the sub piston and is controlled to move the sub valve element in a direction away from the sub valve seat; and a sub pilot port for therethrough supplying the sub pressure chamber with a pilot fluid, and wherein the main valve further comprises a return spring which biases the main valve element toward the main valve seat, while the sub valve further comprises a return spring which biases the sub valve element toward the sub valve seat.

In the vacuum regulating valve of the above mode, the main valve comprises a partition wall whose opposite sides respectively partially defines the valve chamber and the main pressure chamber and the return spring of the main valve is disposed between the partition wall and the main valve element, while the sub valve comprises a cylinder cover which covers a rear side of the sub piston toward which the sub piston is retracted when the sub valve element is separated from the sub valve seat and the return spring of the sub valve is disposed between the sub piston and the cylinder cover.

According to a specific mode of the invention, at least one of the main valve operating unit and the sub valve operating unit of the vacuum regulating valve further comprises a valve opening regulating mechanism which comprises: a valve opening setting shaft a base end of which is in contact with a rear face of the corresponding main or sub piston which face is on the side of the piston toward which the piston is retracted when the corresponding valve element is separated from the corresponding valve seat; and a valve opening setting shaft driving mechanism capable of continuously driving the valve opening setting shaft in an advance or retract direction to a desired axial position, so that a distance of the corresponding main or sub valve element from the corresponding main or sub valve seat, which defines an opening degree of the corresponding main or sub valve, is controllable by controlling an operating position of the corresponding main or sub piston which is determined in accordance with the displacement of the valve opening setting shaft by the valve opening setting shaft driving mechanism.

In the vacuum regulating valve according to the above specific mode, the valve opening setting shaft driving mechanism comprises: an electric motor for valve opening control which has an output shaft; and a motion converting mechanism which comprises a rotating screw rod connected to the output shaft of the electric motor for valve opening control, and a internally threaded nut which is mounted on the screw rod such that the nut is restrained from turning and capable of moving axially along the screw rod, the motion converting mechanism converting a rotary motion, in the forward and backward directions, of the output shaft of the electric motor for valve opening control into a linear reciprocating motion of the screw rod, and a base end of the valve opening setting shaft being joined to the nut while the other end of the valve opening setting shaft being a free end which is separably in contact with the corresponding main or sub piston.

The valve opening regulating mechanism has a sensor for measuring an amount of axial displacement of the valve opening setting shaft, and the valve opening setting shaft driving mechanism operates to control the axial position of the valve opening setting shaft on the basis of an output of the sensor.

According to another specific mode of the invention, at least one of the main valve element operating unit and the sub valve element operating unit further comprises: an electric motor for valve element operation which has an output shaft; and a motion converting mechanism which comprises a rotating screw rod connected to the output shaft of the electric motor for valve element operation, and a internally threaded nut which is mounted on the screw rod such that the nut is restrained from turning and capable of moving axially along the screw rod, the motion converting mechanism converting a rotary motion, in the forward and backward directions, of the output shaft of the electric motor for valve element operation into a linear reciprocating motion of the screw rod, and an end of the corresponding main or sub valve stem being joined to the nut.

According to a further specific mode of the invention, each of the main valve element operating unit and the sub valve element operating unit further comprises the electric motor for valve element operation and the motion converting mechanism which converts the rotary motion of the output shaft of the electric motor for valve element operation into the linear reciprocating motion of the screw rod, and the sub valve element operating unit is constructed such that the sub valve stem and the nut are joined via a disc-shaped intermediate member which is guided by a plurality of guide pins.

The vacuum regulating valve constructed according to the invention is capable of finely and accurately regulating the vacuum in the vacuum vessel, by controlling the opening and closing of the main valve and the sub valve in a coordinated manner or independently. Further, the vacuum regulating valve of this invention, where the sub valve of a relatively small size as prepared separately from the main valve is directly attached to the external side surface of the casing of the main valve, is significantly simplified in structure in comparison with the conventional valve where the structure having the same function as the sub valve of this invention is incorporated in the valve element, shaft and piston of the main valve.

DETAILED DESCRIPTION OF THE PREFERRED EMBODIMENTS

Figure 1:
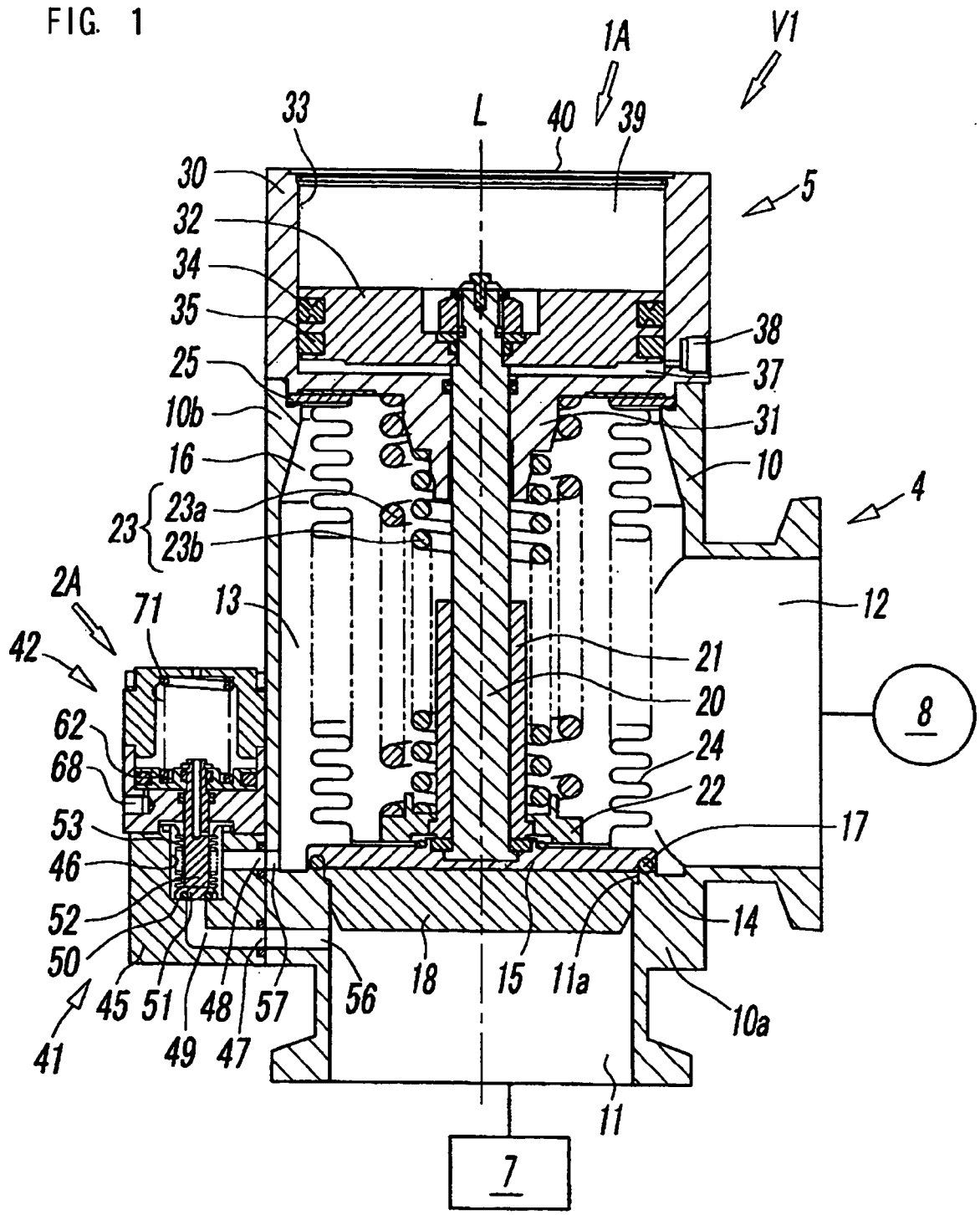
FIG. 1 is a cross sectional view showing a vacuum regulating valve according to a first embodiment of the invention in its closed state.
Figure 2:
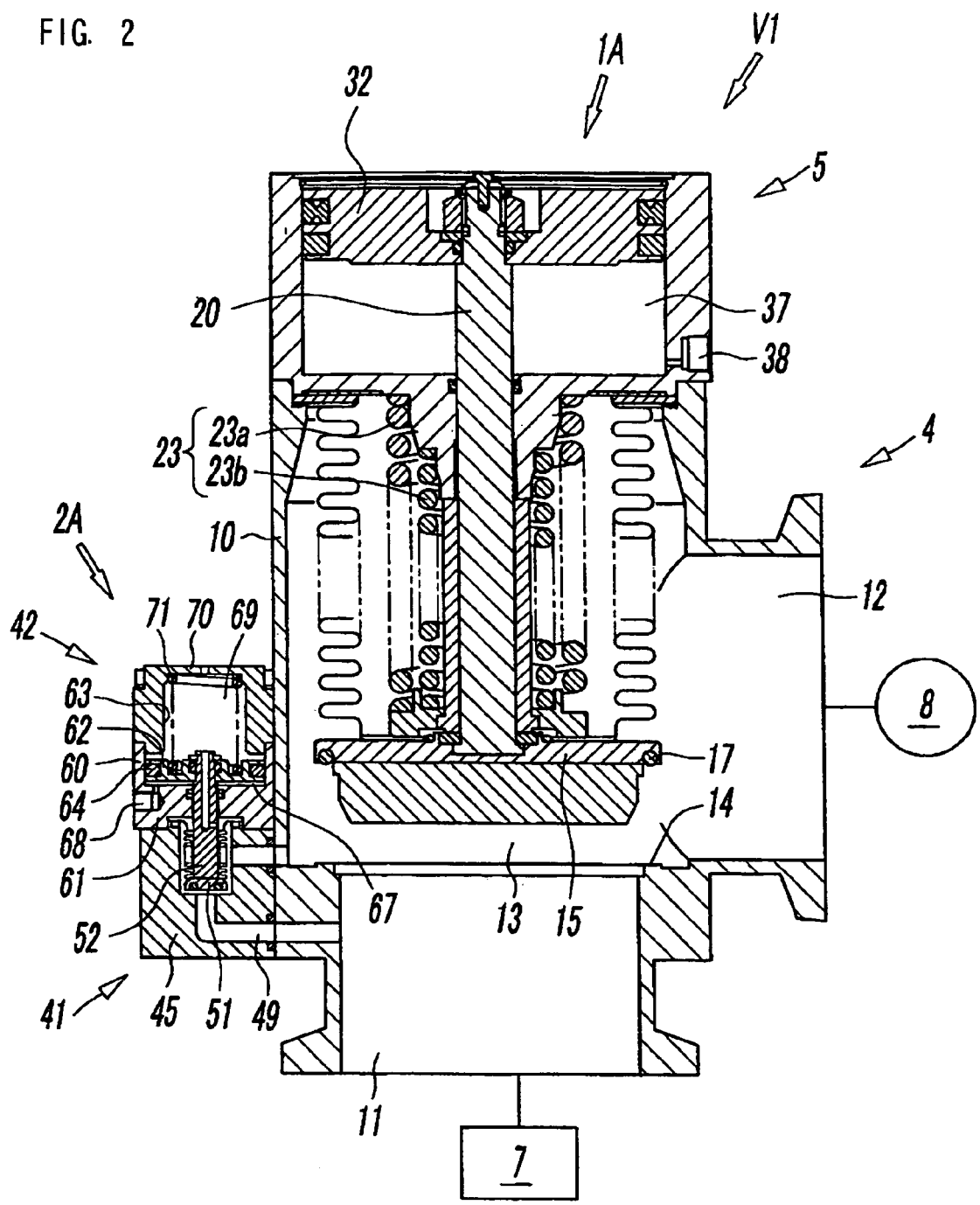
FIG. 2 is a cross sectional view of the vacuum regulating valve of FIG. 1 in its open state.

FIGS. 1 and 2 shows a vacuum regulating valve V1 according to a first embodiment of the invention. The vacuum regulating valve V1 comprises a main valve 1A of a relatively large size for controlling evacuation in a high flow phase in an evacuation operation, and a sub valve 2A of a relatively small size for controlling evacuation in a low flow phase of the evacuation operation, which serves as a "bypass" valve, as will be described later.

The main valve 1A has a main valve principal body 4 having a main valve element 15 for opening and closing a main fluid passage 13, and a main valve element operating unit 5 for bringing the main valve element 15 into its open and closed state. The principal body 4 and the main valve element operating unit 5 are joined in series along an axis L of the main valve 1A of the vacuum regulating valve V1.

The principal body 4 has a main valve casing 10 which is a substantially cylindrical hollow column in shape and defines therein a main valve chamber 16 extending along the axis L. However, the shape of the main valve casing 10 may be a substantially square or rectangular column. The main valve casing 10 has a first main port 11 connected to a vacuum vessel 7 and a second main port 12 connected to a vacuum pump 8. The first main port 11 is open at a first end 10a of the main valve casing 10 in the direction of the axis L, while the second main port 12 is open in a side surface of the main valve casing 10 in the direction perpendicular to the direction of the axis L. In the main valve chamber 16, there is defined the main fluid passage 13 connecting the first and second main ports 11, 12, and a main valve seat 14 encircling the first main port 11. More specifically, the main valve seat 14 is formed at the outer periphery of a communication opening 11a of the first main port 11 where the first main port 11 communicates with the main valve chamber 16.

The main valve 1A is a poppet valve where the valve element 15 is seated on and separated from the main valve seat 14 to bring the main valve 1A into its closed and open state, and is disposed coaxially with the main valve seat 14, inside the main valve casing 10. The main valve element 15 is a disc-shaped member, and an annular valve seal 17 of a rubber is attached to a peripheral portion on of one of opposite faces of the main valve element 15 which is on the advancing side (the lower side as seen in FIG. 1) and is brought into contact with and away from the main valve seat 14. Further, a generally disc-shaped nose 18 for flow rate control is disposed on the inner side of the valve seal 17 on the face of the main valve element 15 on the advancing side. More specifically, the nose 18 has a tapered shape whose diameter decreases toward the advancing side, and functions to control or restrict a gas flow rate in an initial period (corresponding to the low flow phase) of an evacuation operation by being gradually displaced in the retracting direction so as to progressively increase the degree of valve opening of the main valve 1A. However, providing the nose 18 is not essential.

A main valve stem 20 extends inside the main valve casing 10 along the axis L from the central port portion of the face of the main valve element 15 on the retracting side (the upper side as seen in FIG. 1), through a partition wall 31 (on opposite sides of which are disposed the principal body 4 and the main valve element operating unit 5) into the main valve element operating unit 5, so that the other end of the main valve stem 20 (opposite to the end fixed to the main valve element 15) is joined to a main piston 32.

Around an axial port portion of the main valve stem 20 on the side of the main valve element 15, there is attached a cylindrical sleeve 21 for defining the open or retracted position of the main valve element 15. The sleeve 21 extends in a length along the main valve stem 20 from the surface of the main valve element 15 on the retracting side, and an end of the sleeve 21 on the retracting side is brought into contact with a contact port portion of the partition wall 31 when the main valve element 15 is retracted to the maximum. On the face of the main valve element 15 on the retracting side (which face will be referred to as "retracting-side face"), there is also disposed a spring seat 22, between which and the partition wall 31 is disposed a return spring 23 in the form of a coiled spring which holds the main valve element 15 against the main valve seat 14. The return spring 23 comprises a first spring 23a of a relatively large diameter and a second spring 23b of a relatively small diameter, which are coaxially disposed.

Further, a bellows 24 that is expansible and contractible is disposed such that the bellows 24 encloses the main valve stem 20, sleeve 21 and the return spring 23. The bellows 24 is made of an airtight material such as a metal, and an end of the bellows 24 is attached to the retracting-side face of the main valve element 15, while the opposite end of the bellows 24 is attached to a support plate 25 disposed between an end portion (on the retracting side) of the main valve casing 10 and the partition wall 31. The bellows 24 expands and contracts in accordance with the advancing and retracting movement of the main valve element 15 toward and away from the main valve seat 14. The interior space enclosed by the bellows 24 is open to the exterior space through an aperture not shown.

The main valve element operating unit 5 takes the form of a fluid pressure cylinder having a main cylinder casing 30 coaxially joined to a second end 10b of the main valve casing 10. The main cylinder casing 30 has a cylindrical (or square or rectangular columnar) shape similar to that of the main valve casing 10, and one end of the main cylinder casing 30 in the direction of the axis L is closed by the partition wall 31 which separates the main valve casing 10 from the main cylinder casing 30. The main cylinder casing 30 defines therein a main cylinder chamber 33 and slidably receives the main piston 32 via a sealing member 34 and a wear ring 35. As described above, the main valve stem 20 extends through the partition wall 31 into the main cylinder chamber 33, such that the main valve stem 20 is movable in sliding contact with a relevant bore formed through the partition wall 31, so that the end (on the retracting side) of the main valve stem 20 is joined to the main piston 32.

Between the partition wall 31 and one of opposite faces of the main piston 32 on the side of the partition wall 32 is formed a main pressure chamber 37, which is connected to a main pilot port 38 open in a side surface of the main cylinder casing 30. A chamber defined between the other of the opposite faces of the main piston 32 and a cylinder cover 40 serves as a breath chamber 39 in communication with the atmosphere.

While the main valve 1A is in its closed state as shown in FIG. 1, when the main pressure chamber 37 is provided with a pilot fluid (e.g. a compressed gas) of a pressure as suitably adjusted through the main pilot port 38, the main piston 32 is displaced in the retracting direction or upward when seen in FIG. 1 with the main valve stem 20 also being retracted, compressing the return spring 23, and the main valve element 15 is thereby separated from the main valve seat 14, that is, the main valve 1A is opened, as shown in FIG. 2. On the other hand, when the pilot fluid in the main pressure chamber 37 is released while the main valve 1A is in its open state as shown in FIG. 2, the resilience of the return spring 23 advances the main piston 32 and main valve stem 20 to drive the main valve element 15 onto the main valve seat 14, that is, the main valve 1A is closed.

There will now be described the sub valve 2A. The sub valve 2A is attached to the outer side surface of the main valve casing 10 of the main valve 1A at a position near the first main port 11 to be adjacent to the main valve seat 14. The sub valve 2A has a sub valve principal body 41 and a sub valve element operating unit 42, which are joined in the axial direction thereof and constructed substantially identically with the main valve principal body 4 and the main valve element operating unit 5, respectively. In the description below, the elements similar to the corresponding elements of the main valve A1 are only briefly described for avoiding redundancy. It is noted, however, that the axial length of the sub valve 2A is about one third of that of the main valve 1A with each element of the sub valve 2A accordingly scaled down, making the form of some elements of the sub valve 2A slightly different from that of the corresponding elements of the main valve 1A, due to the limit on the dimensions of the elements. Thus, the functional aspect of the sub valve 2A including the fundamental structure and the principle of operation is substantially identical with that of the main valve 1A.

As shown in FIG. 1, the principal body 41 of the sub valve 2A has a sub valve casing 45 in which is defined a sub valve chamber 46. The sub valve casing 45 has: a first bypass port 47 and a second bypass port 48 that are formed through a side surface of the sub valve casing 45; a bypass passage 49 having a relatively small cross section and extending through the sub valve chamber 46 to connect the first and second bypass ports 47, 48; a sub valve seat 50 disposed in the bypass passage 49 and having an opening area smaller than that of the main valve seat 14; a sub valve element 51 to be seated on and separated from the sub valve seat 50 so as to bring the sub valve 2A into its closed and open state; a sub valve stem 52 extending from the sub valve element 51 toward the sub valve element operating unit 42; and a bellows 53 which is expansible and contractible and disposed in the sub valve chamber 46 such that the bellows encloses the sub valve stem 52. Similarly to the valve element 15 of the main valve 1A, a nose may be provided to the sub valve element 51.

The first bypass port 47 communicates with the first main port 11 through a first connecting hole 56 formed through the casing 10 of the main valve 1A, while the second bypass port 48 communicates, through a second connecting hole 57, with the main valve chamber 16 which is in communication with the second main port 12. Thus, the second bypass port 48 is in communication with the main port 12. By this arrangement, the bypass passage 49 extends outside the main valve casing 10 and bypasses the main valve seat 14.

As shown in FIGS. 1 and 2, the sub valve element operating unit 42 has a sub cylinder casing 60 defining therein a sub cylinder chamber 63. An end of the sub cylinder chamber 63 is closed by a partition wall 61 integral with a sub cylinder casing 60, and the other end of the sub cylinder chamber 63 is closed by a cylinder cover 70. In the sub cylinder chamber 63 is slidably accommodated a sub piston 62 via a sealing member 64. The sub piston 62 is joined to an end (on the retracting side) of the sub valve stem 52, which extends through the partition wall 61 into the sub cylinder chamber 63 such that the sub valve stem 52 is axially movable in sliding contact with a relevant bore formed through the partition wall 61.

Between the sub piston 62 and the partition wall 61 is defined a sub pressure chamber 67 connected to a sub pilot port 68 open in a side surface of the sub cylinder casing 60. There is formed a chamber on the retracting side of the sub piston 62, to serve as a breath chamber 69 in communication with the atmosphere. In the breath chamber 69, a return spring 71 is disposed between the sub piston 62 and the cylinder cover 70. The return spring 71 of the sub valve 2A and the return spring 23 of the main valve 1A are different from each other with respect to their positions in the respective valves, but have an identical function, that is, the return spring 71 holds the sub valve element 51 against the valve seat 50.

Figure 3:
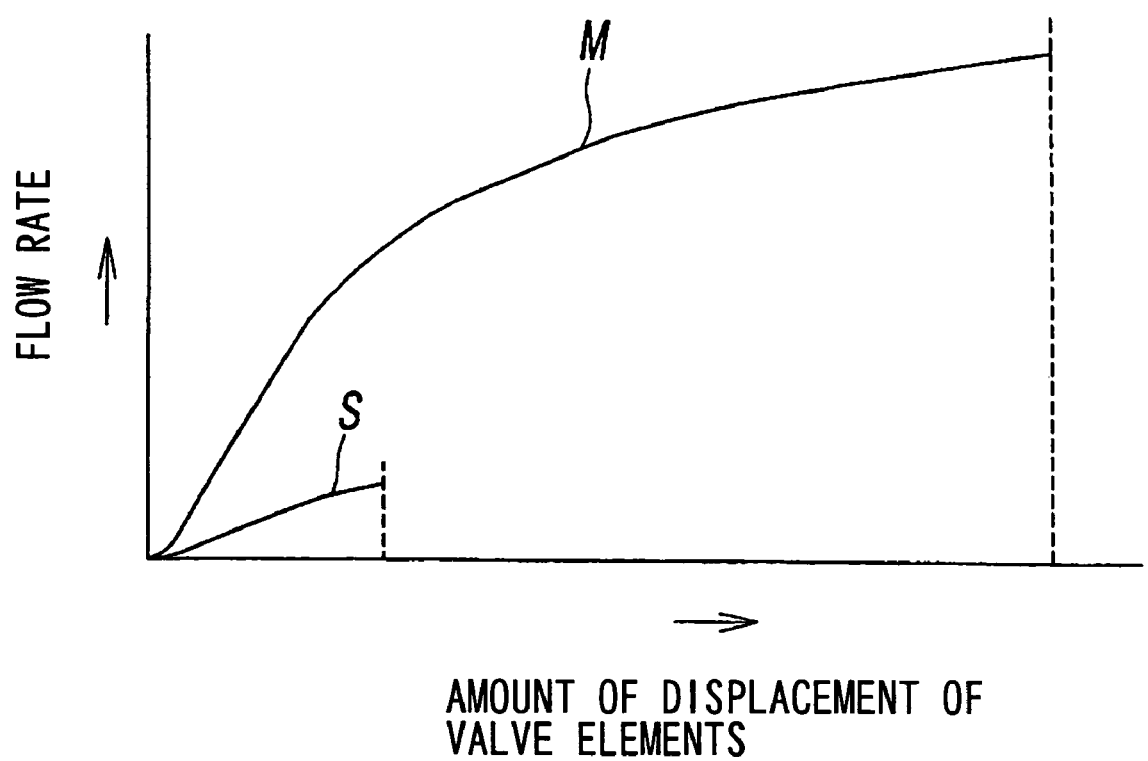
FIG. 3 is a graph indicating a flow rate characteristic of the vacuum regulating valve.

The operation of the sub valve 2A is substantially identical with that of the main valve 1A and is not described for avoiding redundancy. FIG. 3 shows a graph indicating the flow rate characteristic of each of the main and sub valves 1A, 2A; namely, reference sign M denotes the flow rate characteristic of the main valve 1A, while reference sign S denotes the flow rate characteristic of the sub valve 2A.

The vacuum regulating valve V1 constructed as described above regulates the vacuum in the vacuum vessel 7, by supplying the pilot fluids to the main and sub pressure chambers 37, 67 through the pilot ports 38, 68 of the main and sub valves 1A, 2A, respectively, from a controller (not shown), based on the output of a pressure sensor provided to the vacuum vessel 7, to thereby drive the main and sub pistons 32, 62 to advance and retract the main and sub valve elements 15, 51 to move the valve elements 15, 51 onto and away from the main and sub valve seats 14, 50, respectively. In this regard, the sub valve 2A of the relatively small size is selectively operated in the low flow phase of a flow rate control operation, such as the initial period of a valve opening operation for opening the vacuum regulating valve V1 and the terminal period of a valve closing operation for closing the valve V1, while the main valve 1A of the relatively large size is operated in the other phase, i.e., high flow phase, of the flow rate control operation, or when a rapid evacuation is performed. For instance, when the pressure in the vacuum vessel 7 is decreased, the sub piston 62 is initially driven to separate the sub valve element 51 from the sub valve seat 50 so that a small volume of gas is discharged through the bypass passage 49, and then, with a slight time lag, the main piston 32 is driven to allow the main valve 1A to be opened so as to perform the rest of the evacuation or discharge.

In the above arrangement, the pilot fluids supplied through the main and sub pilot ports 38, 68 may or may not be of the same pressure. In the case where the pilot fluids are of the same pressure, it may be arranged such that the pilot port 68 of the sub valve 2A is omitted and the pressure chamber 37 of the main valve 1A and the pressure chamber 67 of the sub valve 2A are directly connected to each other so as to supply both pressure chambers 37, 67 with a common pilot fluid. For instance, it may be arranged such that a communication hole for communication with the main pressure chamber 37 is formed through a side surface of the main cylinder casing 30 while another communication hole for communication with the sub pressure chamber 67 is formed through a side surface of the sub cylinder casing 60, and these communication holes are connected to each other by some means. In either case, i.e., whether the pilot fluids supplied to the main and sub pressure chambers are the same or not the same, the pressure receiving areas of the main and sub valve elements 15, 51, the spring forces of the return springs 23, 71, and the pressures of the pilot fluids supplied to the pressure chambers 37, 67 need be determined in relationship with one another, so that the sub valve 2A is opened slightly prior to an opening of the main valve 1A.

The way of operation of the vacuum regulating valve V1 is not limited to the one described above, but may be various; the valve V1 can be used in various ways by opening and closing the main and sub valves 1A, 2A in a coordinated manner or independently of each other, as needed. For instance, once the pressure in the vacuum vessel 7 has been reduced to a level, the main valve 1A is closed; when the vacuum in the vacuum vessel 7 is changed due to a reactant gas or others supplied thereto, an evacuation operation is performed by opening and closing the sub valve 2A so as to hold the vacuum level constant.

The present vacuum regulating valve where the sub valve 2A of a relatively small size which is separately prepared from the main valve 1A is directly attached to the outer side surface of the main valve casing 10, is significantly simplified in structure, compared to the conventional valve where a closing/opening mechanism having the same function as the sub valve 2A is dually incorporated in the inside of the valve element 15, shaft 20 and piston 32 of the main valve 1A.

Figure 4:
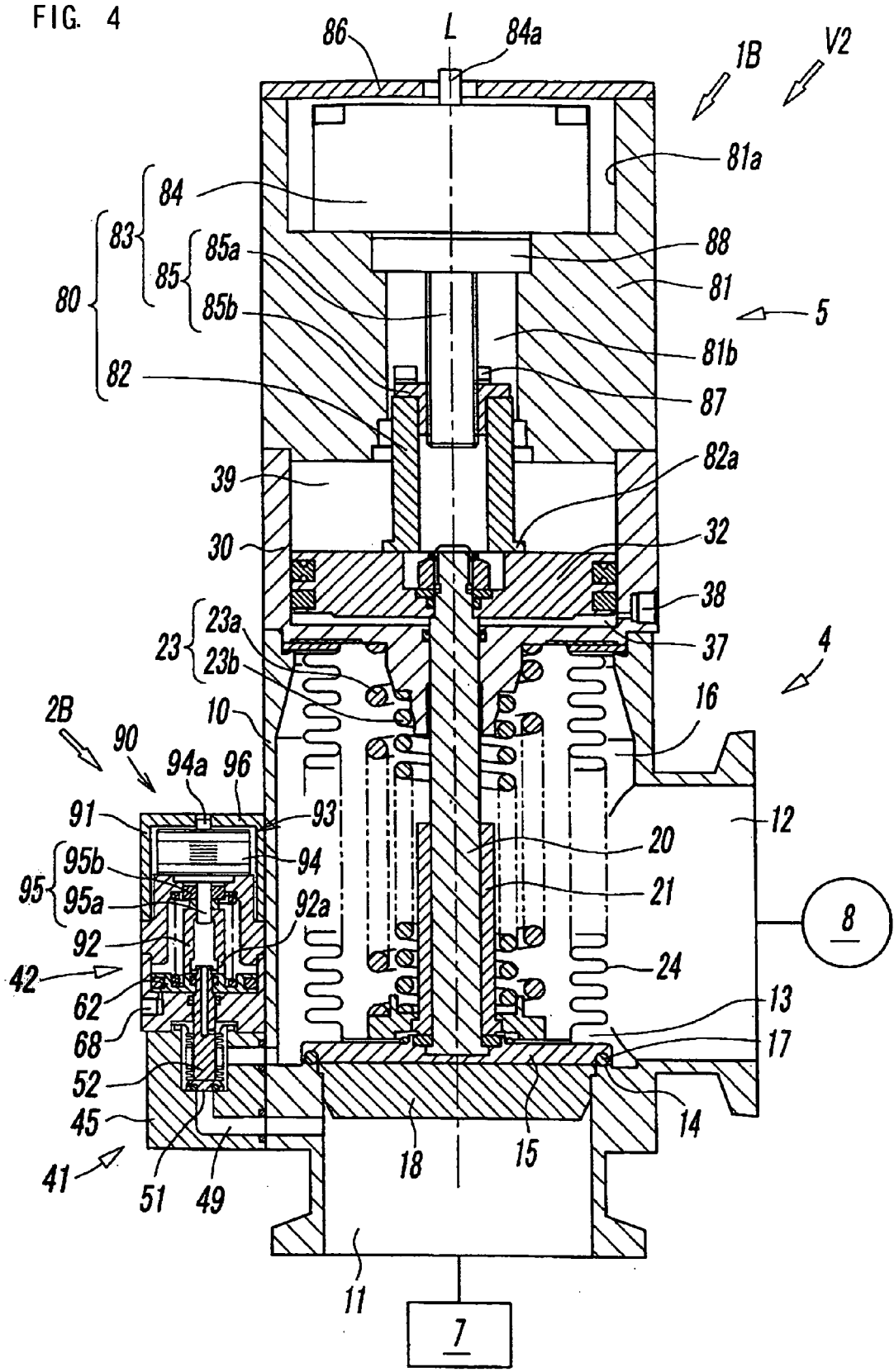
FIG. 4 is a cross sectional view showing a vacuum regulating valve according to a second embodiment of the invention in its closed state.
Figure 5:
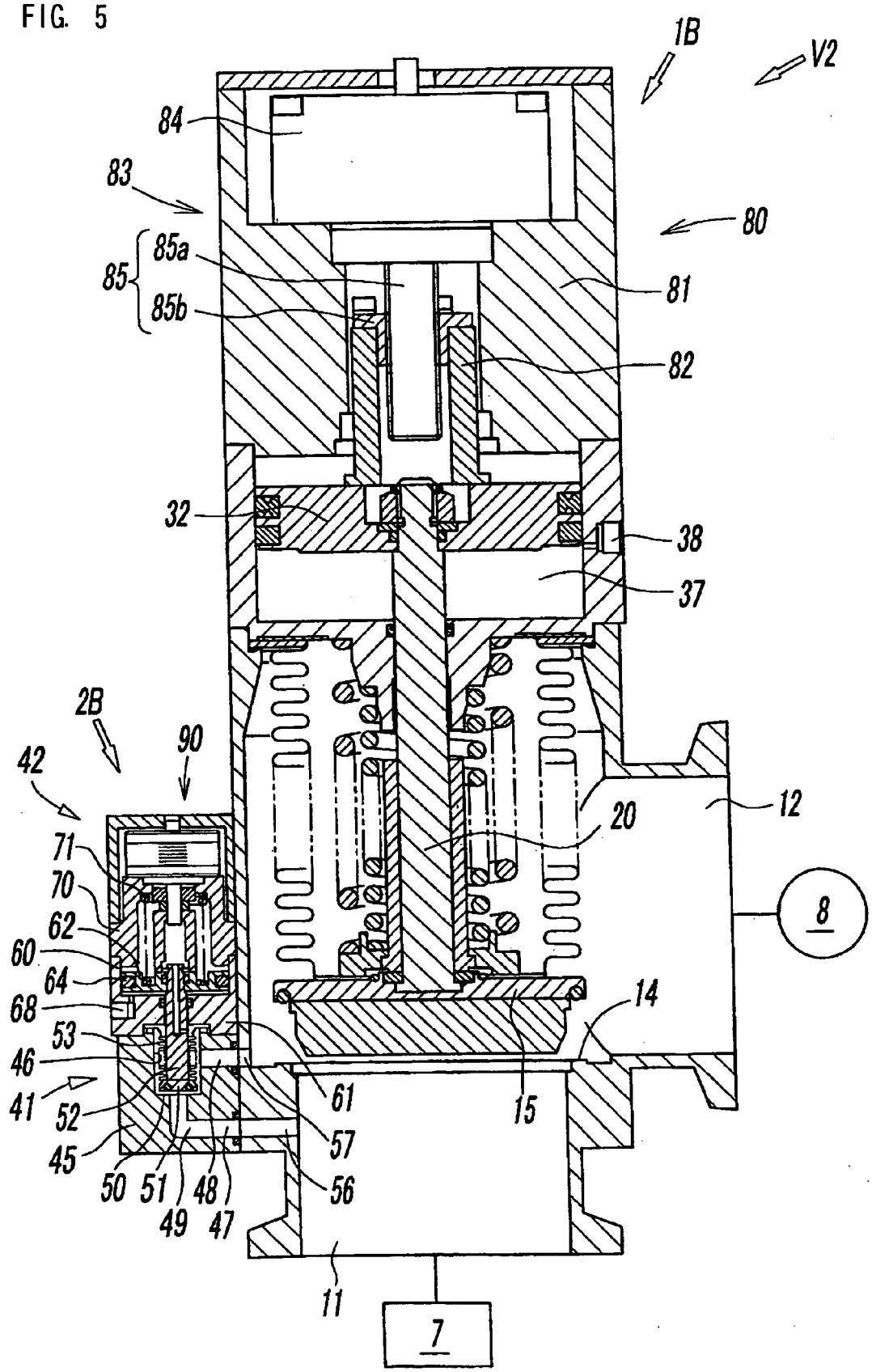
FIG. 5 is a cross sectional view of the vacuum regulating valve of FIG. 4 in its open state.

FIGS. 4 and 5 shows a vacuum regulating valve V2 according to a second embodiment of the invention, which is different from the vacuum regulating valve V1 according to the first embodiment in that the main valve element operating unit 5 of a main valve 1B and the sub valve element operating unit 42 of a sub valve 2B respectively further comprises a main valve opening regulating mechanism 80 and a sub valve opening regulating mechanism 90, which operate to set or adjust the opening of the main and sub valve elements 15, 51, respectively. The fundamental structure and operation of the main and sub valves 1B, 2B are substantially identical with those of the main and sub valves 1A, 2A of the vacuum regulating valve V1 according to the first embodiment. Therefore, the following description of the second embodiment focuses on the main and sub valve opening regulating mechanisms 80, 90; as to the rest, other major elements are denoted by the same reference numerals used in the first embodiment and not illustrated here.

The main valve opening regulating mechanism 80 provided to the main valve 1B is incorporated in an end block 81 which is coaxially joined to an end (on the retracting side) of the main cylinder casing 30 and serves as a cylinder cover as well. The end block 81 is a cylindrical (or square or rectangular columnar) member having a shape similar to that of the main cylinder casing 30, and incorporates a valve opening setting shaft 82 an end of which on the advancing side is in contact with a face of a main piston 32 on the retracting side, and a valve opening setting shaft driving mechanism 83 which is capable of continuously advancing and retracting the valve opening setting shaft 82 to a desired axial position. The main valve opening regulating mechanism 80 is constituted by the valve opening setting shaft 82 and the valve opening setting shaft driving mechanism 83. In operation, the valve opening setting shaft driving mechanism 83 operates to displace the valve opening setting shaft 82 to a desired axial position to control the operating position of the main piston 32, so as to set the distance of the main valve element 15 from the main valve seat 14, i.e., the degree of valve opening of the main valve 1B.

The valve opening setting shaft driving mechanism 83 comprises an electric motor 84 for valve opening control which is rotatable in the forward and backward directions and has an output shaft, and a motion converting mechanism 85 which converts the rotary motion of the output shaft of the motor 84 in the forward and backward directions into a linear reciprocating motion. The motor 84 is disposed inside a motor chamber 81a formed in an axial end portion of the end block 81, while the motion converting mechanism 85 is accommodated in a cavity 81b connecting the motor chamber 81a and a breath chamber 39. In FIG. 4, reference numeral 86 denotes an end cover which closes an end of the end block 81.

The motion converting mechanism 85 comprises a rotating screw rod 85a and a internally threaded nut 85b. The screw rod 85a is connected to the output shaft 84a of the motor 84 to be driven by the motor 84. The internally threaded nut 85b is mounted on the screw rod 85a such that the nut 85b is restrained from turning and capable of moving along the screw rod 85a. The base end of the valve opening setting shaft 82 (which has a cylindrical shape) is fastened to the nut 85b with a screw 87. The other end 82a of the valve opening setting shaft 82 is a free end extending out of the cavity 81b and is separably in contact with the central port portion of the face of the main piston 32 on the retracting side. Accordingly, the screw rod 85a and nut 85b that together constitute the motion converting mechanism 85, the valve opening setting shaft 82, main piston 32, main valve stem 20, main valve element 15 and main valve seat 14 are all disposed on the axis L. Although the first main port 11 is also disposed on the axis L in this specific case, it is not essential to dispose the first main port 11 on the axis L.

In the main valve opening regulating mechanism 80, when the electric motor 84 for valve opening control is rotated in the forward and backward directions, the rotary motion is converted by the motion converting mechanism 85 into the linear reciprocating motion which is transmitted to the valve opening setting shaft 82. Thus, the valve opening setting shaft 82 reciprocates a distance corresponding to the amount of rotation of the motor 84. Accordingly, when the main piston 32 is operated to separate the valve element 15 from the valve seat 14 while the main valve 1B is in the closed state as shown in FIG. 4, the motor 84 is rotated in a required amount to retract the valve opening setting shaft 82 to a position as set, so that the main piston 32 in contact with the valve opening setting shaft 82 also retracts to the corresponding operating position and stops there, as shown in FIG. 5. The valve opening is thus set, namely, the valve opening is continuously controllable to a desired degree, by controlling the position of the valve opening setting shaft 82 by the motor 84.

On the other hand, when the valve opening is changed while the main valve 1B is in the open state as shown in FIG. 5, the valve opening setting shaft 82 is displaced by the driving mechanism 83 to change the operating position of the main piston 32. More specifically, when the valve opening degree of the main valve 1B is to be increased from an intermediate opening degree (corresponding to a state of the main valve 1B between the fully open state and the closed state), the valve opening setting shaft 82 is retracted to move the main piston 32 in the direction to further open the main valve 1B by the pilot fluid introduced into the main pressure chamber 37. When the valve opening degree of the main valve 1B is to be decreased from an intermediate opening degree, on the other hand, the valve opening setting shaft 82 is advanced to push and advance the main piston 32 in the direction to close the main valve 1B to a certain extent. In this regard, the pressure of the pilot fluid in the main pressure chamber 37 is adjusted so as to reduce the necessary force to push the piston 32 as required of the valve opening setting shaft 82.

Where the vacuum vessel 7 is to be hermetically closed while the vacuum therein being held at a constant value, or where the main valve 1B is to be closed, for instance in an emergency, the pilot fluid in the main pressure chamber 37 is discharged so that the main valve element 15 is advanced together with the main piston 32 and the main valve stem 20 by the resilience of the return spring 23 to eventually bring the valve element 15 into contact with the valve seat 14.

In this regard, to enable the valve opening setting shaft 82 to reciprocate only a required distance, the main valve opening regulating mechanism 80 has a sensor 88 capable of detecting an amount of displacement of the valve opening setting shaft 82. The sensor 88 consists of a rotary encoder attached to the motor 84, detects the amount of rotation of the motor 84 so as to indirectly detect the amount of displacement of the valve opening setting shaft 82, and outputs a detection signal based on which a controller (not shown) controls the motor 84 to continuously displace the valve opening setting shaft 82 to a desired axial position. However, the sensor 88 may be of a type capable of directly detecting the position of the valve opening setting shaft 82; for instance, where magnetic or optical calibrations are provided on the valve opening setting shaft 82, a magnetic sensor or an optical sensor which reads the calibrations is employed.

The sub valve opening regulating mechanism 90 will be described. The sub valve opening regulating mechanism 90 provided to the sub valve 2B is substantially identical with the valve opening regulating mechanism 80 for the main valve 1B in structure and operation, except that the sub valve opening regulating mechanism 90 is scaled down with respect to the valve opening regulating mechanism 80 for the main valve 1B, with some elements (e.g., end block 91 and valve opening setting shaft 92) of the sub valve 2B accordingly slightly modified in form from the corresponding elements of the main valve 1B. Hence, major elements similar to the corresponding elements of the main valve opening regulating mechanism 80 are denoted by respective reference numerals each being a sum of ten and the number of the corresponding reference numeral in the mechanism 80, and not described here.

The vacuum regulating valve V2 according to the second embodiment regulates the vacuum in the vacuum vessel 7 by operating the main and sub valves 1B, 2B in a coordinated manner or independently of each other, just like the vacuum regulating valve V1 according to the first embodiment. However, since the valve V2 of the second embodiment is capable of continuously setting or adjusting the valve openings of the main and sub valves 1B, 2B by the main and sub valve opening regulating mechanisms 80, 90, respectively, it is enabled to further finely and accurately control the flow rate in comparison to the valve V1 of the first embodiment.

Figure 6:
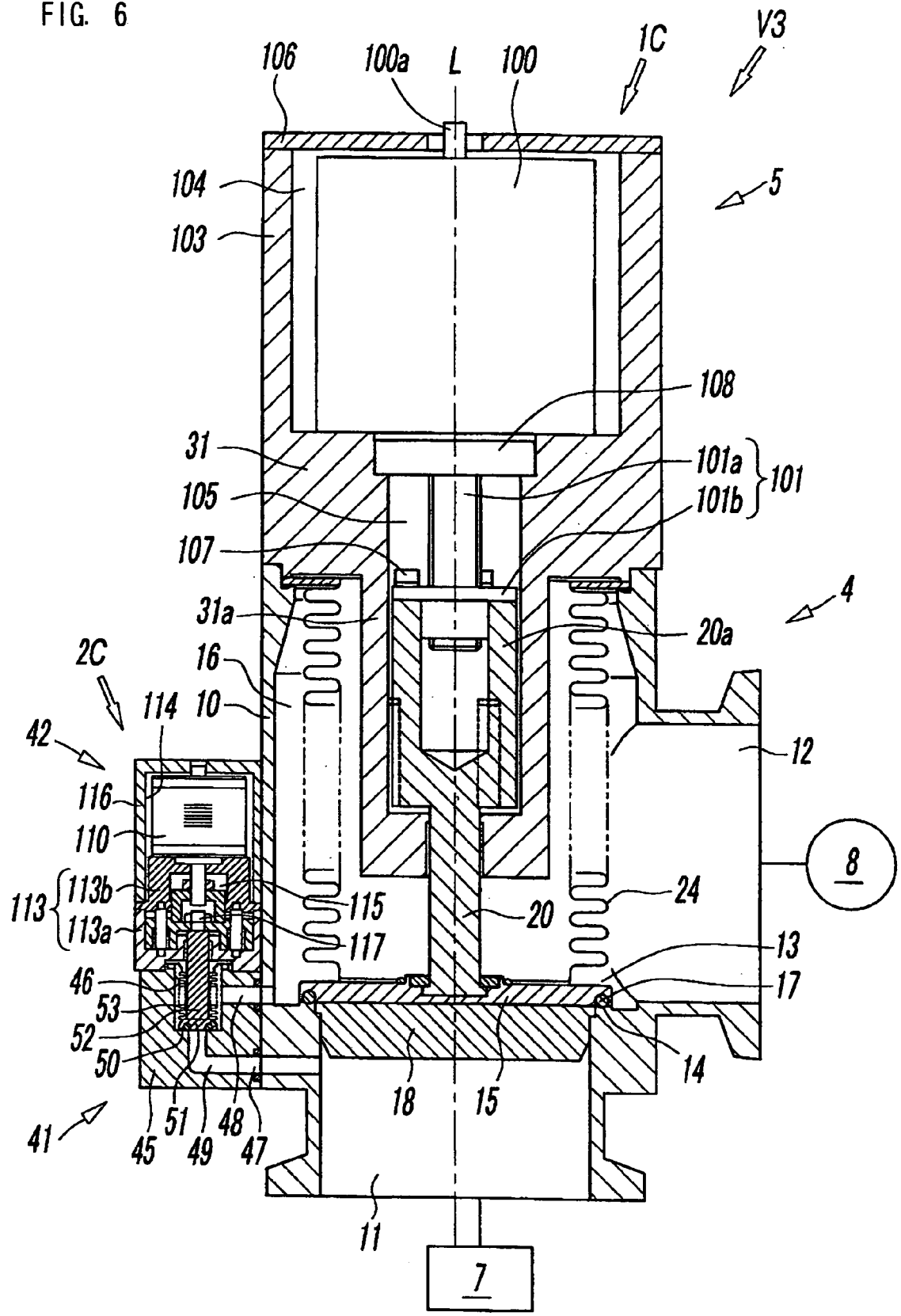
FIG. 6 is a cross sectional view showing a vacuum regulating valve according to a third embodiment of the invention in its closed state.
Figure 7:
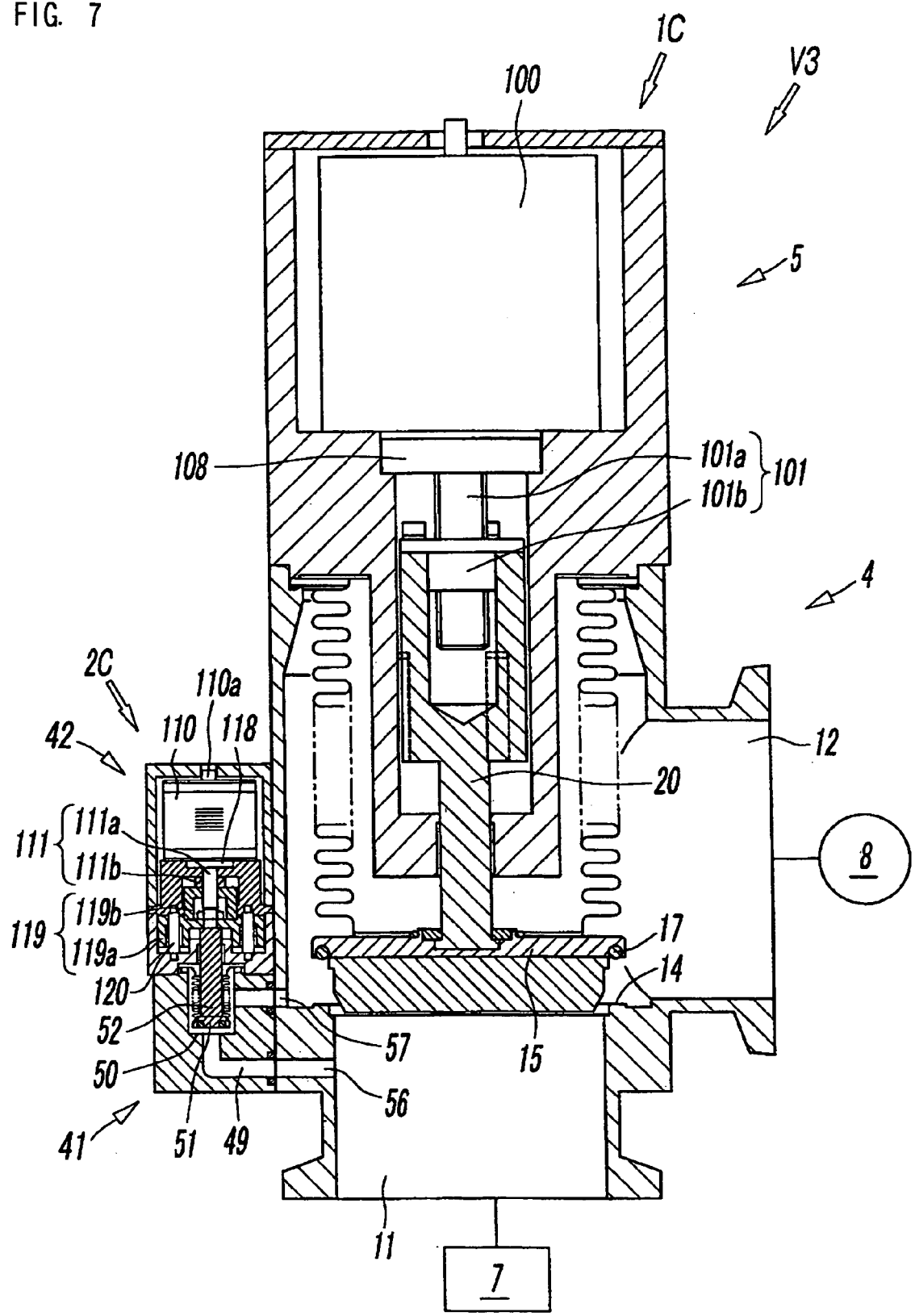
FIG. 7 is a cross sectional view of the vacuum regulating valve of FIG. 6 in its open state.

FIGS. 6 and 7 shows a vacuum regulating valve V3 according to a third embodiment, where a main valve element operating unit 5 of a main valve 1C and a sub valve element operating unit 42 of a sub valve 2C are constructed such that electric motors 100, 110 are employed for operating or driving a main valve element 15 and a sub valve element 51, respectively. This differentiate the valve V3 from the valves V1, V2 of the first and second embodiments where the fluid pressure cylinder is employed as the driving source of the main and sub valve element operating units 5, 42.

More specifically described, the main valve 1C of the vacuum regulating valve V3 of the third embodiment has a main valve principal body 4 having a main valve element 15 for opening and closing a main fluid passage 13, and a main valve element operating unit 5 for operating the main valve element 15. The main valve principal body 4 and main valve element operating unit 5 are joined in series along an axis L of the main valve 1C.

The main valve principal body 4 has a main valve casing 10 in which is defined a main valve chamber 16, a first main port 11 and a second main port 12, a main fluid passage 13, a main valve seat 14 formed in the main fluid passage 13, a main valve element 15 to be seated and separated from the main valve seat 14, a main valve stem 20 extending from the main valve element 15, and a bellows 24. An end portion 20a of the shaft 20 has a cylindrical shape and is joined to a internally threaded nut 101b of a motion converting mechanism 101. The thus constructed main valve principal body 4 of the third embodiment is substantially identical with the principal body 4 of the first and second embodiments in structure, except that the main valve stem 20 is slightly differently formed and the return spring is omitted. Therefore, the major, identical elements are referred to by the same reference numerals as used in the first and second embodiments, and further illustration thereof is dispensed with.

The main valve element operating unit 5 has an end block 103 attached to an end of the main valve casing 10. The end block 103 has a cylindrical or square (or rectangular) columnar shape the same as that of the main valve casing 10, and has a partition wall 31 closing an end of the main valve chamber 16, a cylindrical port portion 31a extending from the partition wall 31 along the axis L of the main valve 1C into the main valve chamber 16, a motor chamber 104 formed in an end portion of the end block, a cavity 105 formed through the partition wall 31 and the cylindrical port portion 31a so as to connect the motor chamber 104 and the main valve chamber 16. The motor 100 for operating a main valve element 15 is disposed in the motor chamber 104, while the motion converting mechanism 101 is disposed in the cavity 105. In FIG. 6, reference numeral 106 denotes an end cover covering an end of the motor chamber 104.

The motion converting mechanism 101 comprises a rotating screw rod 101a connected to and rotated by an output shaft 101a of the motor 100, and the internally threaded nut 101b which is mounted on the screw rod 101a such that the internally threaded nut 101b is not rotatable about the screw rod 101a but axially displaceable relatively to the screw rod 101a. An end of the main valve stem 20 is fastened to the internally threaded nut 101b with a screw 107. Thus, the screw rod 101a, internally threaded nut 101b, main valve stem 20, main valve element 15 and the main valve seat 14 are disposed on the same axis L. Although the first main port 11 is also disposed on the axis L in this specific case, it is not essential to dispose the first main port 11 on the axis L.

In the main valve 1C as shown in FIG. 6, when the motor 100 is rotated in the forward direction while the main valve element 15 is seated on the main valve seat 14, the rotary motion is converted by the motion converting mechanism 101 into a linear motion and the internally threaded nut 101b is retracted along the screw rod 101a with the main valve stem 20 also retracting, separating the main valve element 15 from the main valve seat 14 and thus opening the valve 1C, as shown in FIG. 7. On the other hand, when the motor 100 is rotated in the backward direction while the main valve element 15 is separated from the main valve seat 14, as shown in FIG. 7, the internally threaded nut 101b is advanced together with the main valve stem 20 and main valve element 15, to have the main valve element 15 seated on the main valve seat 14, as shown FIG. 6.

The main valve element 15 can be stopped at a desired position, so that the distance of the main valve element 15 from the main valve seat 14, that is, the degree of opening of the main valve 1C, is continuously settable or adjustable. To this end, the main valve element operating unit 5 has a sensor 108 capable of detecting the amount of displacement of the main valve stem 20 or the internally threaded nut 101b. The sensor 108 consists of a rotary encoder attached to the motor 100 for operating the main valve element 15, which detects the amount of rotation of the motor 100 to indirectly detect the amount of displacement of the main valve stem 20 or the internally threaded nut 101b, and outputs a detection signal based on which a controller (not shown) controls the rotation of the motor 100, thereby continuously operating or driving the main valve element 15 to a proper position.

However, the sensor may be of a type directly detecting the main valve stem 20 or internally threaded nut 101b; for instance, where magnetic or optical calibrations are provided on the main valve stem 20 or internally threaded nut 101b, a magnetic sensor or an optical sensor which reads the calibrations is employed.

The sub valve 2C has a sub valve principal body 41 and a sub valve element operating unit 42, that are substantially identical with the main valve principal body 4 and main valve element operating unit 5 of the main valve 1C, respectively, in structure and operation. The sub valve principal body 41 has, as shown in FIG. 6: the sub valve casing 45 in which is defined a sub valve chamber 46; a first bypass port 47 and a second bypass port 48; a bypass passage 49; a sub valve seat 50 disposed in the bypass passage 49; a sub valve element 51 to be seated on and separated from the sub valve seat 50 so as to bring the sub valve 2C into its closed and open state; a sub valve stem 52 extending from the sub valve element 51; and a bellows 53 disposed such that the bellows encloses the sub valve stem 52. The details of the structure of these members constituting the sub valve 2C, preferred modifications of the sub valve 2C, etc. are substantially identical with those of the sub valves 2A, 2B of the first and second embodiments. Thus, the major, identical elements of the sub valve 2C are denoted by the same reference numerals as used in the first and second embodiments and further illustration thereof is dispensed with.

The sub valve element operating unit 42 is identical with the main valve element operating unit 5 in fundamental structure and operation, but slightly different in details, namely: an end block 113 is sectioned into two parts, i.e., a first block 113a on the side of the sub valve principal body 41 and a second block 113b on the opposite side; a motor 110 is disposed in a motor chamber 114 defined between the second block 113b and an end cover 116; a motion converting mechanism 111 comprising a rotating screw rod 111a and a internally threaded nut 111b is disposed in a cavity 115 defined between the two blocks 113a, 113b; and a disc-shaped intermediate member 119 is disposed to connect the internally threaded nut 111b and the sub valve stem 52. Thus, the intermediate member 119 corresponds to the cylindrical end portion 20a of the main valve stem 20 of the main valve element operating unit 4.

The intermediate member 119 is constituted by two members, namely, a first member 119a of a relatively large diameter and a second member 119b of a relatively small diameter. In assembling the sub valve 2C, the first member 119a is first joined to the sub valve stem 52 with a screw 117, and the second member 119b is then integrally joined to the first member 119a such that the second member 119b covers the screw 117. The second member 119b is joined to the internally threaded nut 111b. In the cavity 115 are provided a plurality of guide pins 120 each extending through the first member 119a and between the first and second blocks 113a, 113b. The displacement of the intermediate member 119 is guided by the guide pins 120. In FIG. 7, reference numeral 118 denotes a sensor.

The vacuum regulating valve V3 according to the third embodiment regulates the vacuum in the vacuum vessel 7 by controlling the main and sub valves 1C, 2C by a controller (not shown) in a coordinated manner or independently of each other, just like the vacuum regulating valves V1, V2 according to the first and second embodiments; more specifically, the controller determines an amount of a driving current to be supplied to the motors 100, 110 of the main and sub valves 1C, 2C based on an output of a pressure sensor provided to the vacuum vessel 7, and operates the motors 100, 110 with the determined amount of the current, so as to operate the valves 1C, 2C as described above. In this regard, since the main and sub valve element operating units 5, 42 can continuously set or adjust the valve opening of the main and sub valves 1C, 2C, the control of the flow rate can be finely and accurately performed.

Although in each of the above embodiments structures of the main and sub valves 1A & 2A; 1B & 2B; 1C & 2C are substantially identical with each other, they may be different. For instance, the sub valve 2B or 2C of the second or third embodiment may be attached to the main valve 1A of the first embodiment; the sub valve 2A or 2C of the first or third embodiment may be attached to the main valve 1B of the second embodiment; or, the sub valve 2A or 2B of the first or second embodiment may be attached to the main valve 1C of the third embodiment.

What is claimed is:

1. A vacuum regulating valve, comprising:
  a main valve with a relatively large size, the main valve is comprised of:
    a casing that defines therein a valve chamber extending along an axis of the main valve, and a main valve element operating unit that is separated from the casing by a partition wall;
  the casing includes:
    a first main port parallel along the axis of the main valve, and coupled with a vacuum vessel;
    a second main port substantially perpendicular to the axis of the main valve, and coupled with a vacuum pump;
    a main fluid passage defined by the main valve chamber, which forms a passageway between the first main port and the second main port; and
    a main valve element coupled with a tapered piece with a decreasing diameter on the first main port side, regulating pressure and vacuum environment of the first main port and the vacuum vessel; the main valve element operating unit includes:
    a cylindrical casing forming a cylindrical chamber, which includes a main piston coupled with a main valve stem that, in turn, is coupled with the main valve element, with the main valve stem extending in the valve chamber from the main valve element and through the partition wall and into the cylindrical chamber;
    the main piston operates to move the main valve element onto the main valve seat, where the main valve element substantially seals and isolates the first main port, the vacuum vessel, and content therein from the main fluid passage when the main valve element is in a closed position, urged against a main valve seat by a set of return springs; the main valve seat is formed at an outer periphery of an opening of the first main port;
    the main piston operates to move the main valve element away from the main valve seat, causing an evacuation of content from the first main port and the vacuum vessel by a negative pressure to permit fluid flow from the vacuum vessel into the first main port, and into main fluid passage and out by the vacuum pump; and
  a sub valve that has a relatively small size, is attached to an external side surface of the casing of the main valve, and comprises:
    a sub valve element operating unit that drives a sub valve stem to move a sub valve element onto and away from a sub valve seat;
    the sub valve element is moved to an open position before the main valve element is moved to an open position to commence an initial evacuation of the first main port and the vacuum vessel by initiating negative pressure to permit fluid flow from the vacuum vessel into a bypass passage;
    the sub valve element is moved to the closed position after the main valve element is moved to the closed position to commence positive pressure within the first main port and the vacuum vessel, preventing fluid flow from the vacuum vessel into the bypass passage;
    a first end of the bypass passage is opened into the first main port, a middle section of the bypass passage is coupled with the sub valve, and the second end of the bypass passage is opened into the main fluid passage, with the bypass passage bypassing the main valve seat.

2. The vacuum regulating valve according to claim 1, wherein the casing has a first connecting hole and a second connecting hole that are formed through the thickness of the casing;
  the first end of the bypass passage is coupled with a first bypass port that is coupled with the first main port through the first connecting hole, while the second end of the bypass passage is coupled with a second bypass port that is coupled with the second main port through the second connecting hole.

3. The vacuum regulating valve according to claim 1 wherein the main valve element operating unit and the sub valve element operating unit are substantially identically constructed.

4. The vacuum regulating valve according to claim 1, wherein the main valve element operating unit comprises: the main piston attached to an end of the main valve stem; a main pressure chamber accommodating a fluid whose pressure acts on the main piston and is controlled to move the main valve element in a direction away from the main valve seat; and a main pilot port for therethrough supplying the main pressure chamber with a pilot fluid, while the sub valve element operating unit comprises: a sub piston attached to an end of the sub valve stem; a sub pressure chamber accommodating a fluid, whose pressure acts on the sub piston and is controlled to move the sub valve element in a direction away from the sub valve seat; and a sub pilot port for therethrough supplying the sub pressure chamber with a pilot fluid, and wherein the main valve further comprises a return spring which biases the main valve element toward the main valve seat, while the sub valve further comprises a return spring which biases the sub valve element toward the sub valve seat.

5. The vacuum regulating valve according to claim 4, wherein the main valve comprises the partition wall whose opposite sides respectively partially defines the valve chamber and the main pressure chamber and the return spring of the main valve is disposed between the partition wall and the main valve element, while the sub valve comprises a cylinder cover which covers a rear side of the sub piston toward which the sub piston is retracted when the sub valve element is separated from the sub valve seat and the return spring of the sub valve is disposed between the sub piston and the cylinder cover.

6. The vacuum regulating valve according to claim 1, wherein at least one of the main valve element operating unit and the sub valve element operating unit of the vacuum regulating valve further comprises a valve opening regulating mechanism which comprises:
  a valve opening setting shaft a base end of which is in contact with a rear face of the corresponding main or sub piston; and
  a valve opening setting shaft driving mechanism capable of continuously driving the valve opening setting shaft in one of an advanced and retracted directions to a desired axial position, so that a distance of the corresponding main or sub valve element from the corresponding main or sub valve seat, which defines an opening degree of the corresponding main or sub valve, is controllable by controlling an operating position of the corresponding main or sub piston which is determined in accordance with the displacement of the valve opening setting shaft by the valve opening setting shaft driving mechanism.

7. The vacuum regulating valve according to claim 6, wherein the valve opening setting shaft driving mechanism comprises: an electric motor for valve opening control which has an output shaft; and a motion converting mechanism which comprises a rotating screw rod connected to the output shaft of the electric motor for valve opening control, and a internally threaded nut which is mounted on the screw rod such that the internally threaded nut is restrained from turning and capable of moving axially along the screw rod, the motion converting mechanism converting a rotary motion, in the forward and backward directions, of the output shaft of the electric motor for valve opening control into a linear reciprocating motion of the screw rod, and an end of the valve opening setting shaft being joined to the internally threaded nut while the other end of the valve opening setting shaft being a free end which is separably in contact with the corresponding main or sub piston.

8. The vacuum regulating valve according to claim 6, wherein the valve opening regulating mechanism has a sensor for measuring an amount of axial displacement of the valve opening setting shaft, and the valve opening setting shaft driving mechanism operates to control the axial position of the valve opening setting shaft on the basis of an output of the sensor.

9. The vacuum regulating valve according to claim 1, wherein at least one of the main valve element operating unit and the sub valve element operating unit further comprises: an electric motor for valve element operation which has an output shaft; and a motion converting mechanism which comprises a rotating screw rod connected to the output shaft of the electric motor for valve element operation, and a internally threaded nut which is mounted on the screw rod such that the internally threaded nut is restrained from turning and capable of moving axially along the screw rod, the motion converting mechanism converting a rotary motion, in the forward and backward directions, of the output shaft of the electric motor for valve element operation into a linear reciprocating motion of the screw rod, and an end of the corresponding main or sub valve stem being joined to the internally threaded nut.

10. The vacuum regulating valve according to claim 9, wherein each of the main valve element operating unit and the sub valve element operating unit further comprises the electric motor for valve element operation and the motion converting mechanism which converts the rotary motion of the output shaft of the electric motor for valve element operation into the linear reciprocating motion of the screw rod, and the sub valve element operating unit is constructed such that the sub valve stem and the internally threaded nut are joined via a disc-shaped intermediate member which is guided by a plurality of guide pins.

* * * * *